(No Model.)

J. E. LAWRENCE.
ANTIFRICTION BEARING.

No. 606,485.  Patented June 28, 1898.

WITNESSES:
Edward Thorpe
C. R. Ferguson

INVENTOR
J. E. Lawrence
BY
ATTORNEYS.

UNITED STATES PATENT OFFICE.

JAMES E. LAWRENCE, OF FARNHAM, CANADA.

ANTIFRICTION-BEARING.

SPECIFICATION forming part of Letters Patent No. 606,485, dated June 28, 1898.

Application filed October 15, 1897. Serial No. 655,298. (No model.)

*To all whom it may concern:*

Be it known that I, JAMES E. LAWRENCE, of the township of Farnham, county of Brome, Province of Quebec, Dominion of Canada, have invented a new and Improved Antifriction-Bearing, of which the following is a full, clear, and exact description.

This invention relates to bearings for shafts, wheels, or the like; and the object of the invention is to provide a bearing which is comparatively simple and compact in its construction, which may be quickly adjusted, which may be operated at a high rate of speed, which may be greatly increased by the addition of oil; but when running at ordinary speed the oil is unnecessary, thus resulting in a much cleaner bearing than a bearing in which oil is used, which by mixing with and holding dirt causes a considerable friction and grinding of the parts.

I will describe an antifriction-bearing embodying my invention and then point out the novel features in the appended claims.

Reference is to be had to the accompanying drawings, forming a part of this specification, in which similar characters of reference indicate corresponding parts in all the views.

Figure 1:
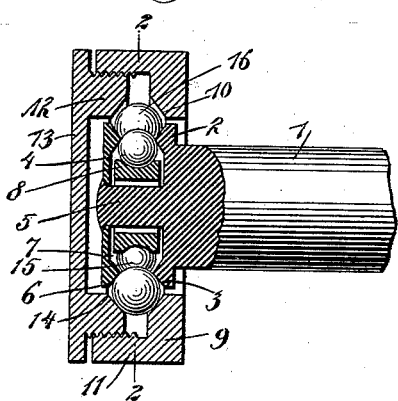
Figure 2:
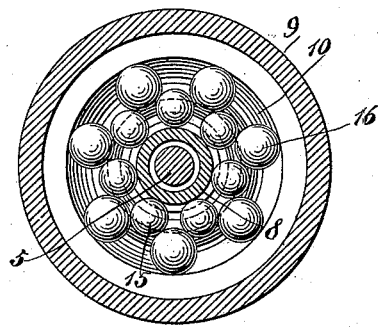
Figure 3:
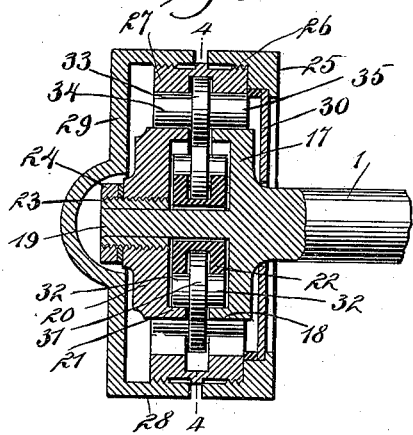
Figure 4:
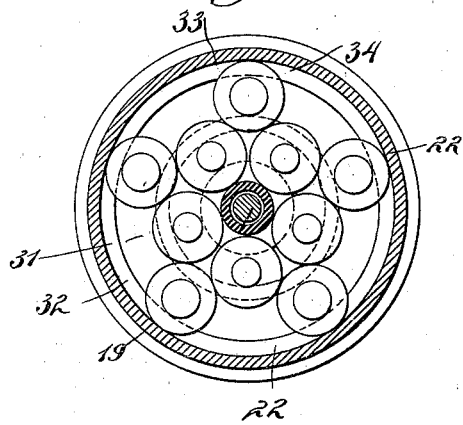

Figure 1 is a sectional elevation of a bearing embodying my invention. Fig. 2 is a section on the line 2 2 of Fig. 1. Fig. 3 is a sectional elevation showing a modification, and Fig. 4 is a section on the line 4 4 of Fig. 3.

It may be here stated that the principle is the same in both examples of my improvement—that is, each has two series of rolling antifriction devices, the said devices in one example being in the form of balls and the other in the form of rollers.

Referring first to the example of my improvement shown in Figs. 1 and 2, 1 designates a shaft or axle having an outwardly-extended annular flange 2, provided with a raceway 3 in its inner face, and 4 is a disk secured to the end of a reduced portion 5, extended from the shaft or axle 1. This disk 4 is provided with a raceway 6, coincident with with the raceway 3. Between the end of the shaft or axle 1 and the inner surface of the disk 4 is an annular chamber 7, in which is placed an annulus 8. The opening through this annulus 8 is somewhat larger than the projection 5, so that there will be no bearing of the annulus against the projection. This annulus 8 is provided with an annular channel for balls, as will be hereinafter described.

Surrounding the shaft or axle, but not engaging therewith, is a ring 9, provided at its inner side with a raceway 10. This ring 9 has an outwardly-extended flange 11, provided with an interior screw-thread to be engaged by the exteriorly-threaded inwardly-extended flange 12 of a cap 13. This flange 12 at its inner surface is provided with a raceway 14. Balls 15 engage in the peripheral groove of the annulus 8, and other balls 16 engage against the balls 15 and also engage with the raceways in the parts 9 and 12. It will be noted that the balls 15 do not engage one with another, but are held separated by the balls 16, which bear upon them. These balls 16 will support the ring 9 entirely free of the shaft or axle 1, and it is obvious that the parts 9 and 13 may rotate relatively to the shaft or axle 1 or that the shaft or axle 1 may rotate relatively to said parts.

In the example of my improvement shown in Figs. 3 and 4 the shaft or axle 1 is provided with an outwardly-extended flange 17, having a forwardly-extended annular flange 18. This shaft or axle 1 has a forwardly-extended stem or reduced portion 19, which supports a disk 20, having a flange 21, extended toward the flange 18. There will be a space, however, between these two flanges. Arranged between the parts 17 and 20 is an annulus 22, provided with an annular channel or groove, and the opening through this annulus is somewhat larger than the reduced portion 19, so that the annulus will not bear thereon. The disk 20 is adjustable longitudinally of the shaft or axle 1, and I have here shown it as provided with an interior thread engaging with the thread in the sleeve 23, secured to the reduced portion 19 of the shaft or axle. Also engaging with the thread of this sleeve, at the outer side of the ring 20, is a jam-nut 24.

In assembling the parts the annulus 22 may be first placed over the reduced portion 19 and the rollers placed thereon, and then the sleeve may be placed upon said reduced portion and the end of the reduced portion may be headed or upset, as shown in the drawings. Then, of course, the disk 20 may be placed.

A supporting-ring 25 surrounds the shaft or axle 1, and this supporting-ring has an interiorly-threaded annular flange 26, which engages with an exterior thread of a bearing-ring 27. Also engaging with the threaded portion of this bearing-ring 27 is the annular flange 28 of an outer cap 29 to prevent as much as possible the entrance of dirt or dust. A ring-plate 30 is supported removably by the part 25. The opening through this ring-plate is somewhat larger than the shaft or axle, so that there will be no bearing between these parts. In this example of my improvement, as well as in the first, there is an inner series and an outer series of rollers. The rollers in this example consist of disks 31, having trunnions 32 on their opposite sides, which bear upon the periphery of the annulus 22, the disk portions being extended into the recess of said annulus. The outer row of rollers consists of similar disks 33, having oppositely-extending trunnions 34 and 35, which bear upon the periphery of the flange 17 and the disk 20. They also bear against the inner portion of the outer bearing-ring 27, and this outer bearing-ring 27 has an interior annular groove into which the disks of the rollers pass. By this arrangement it is obvious that the parts supported from the shaft may rotate relatively thereto or that the shaft may rotate relatively to said parts, depending, of course, upon the use to which the bearing is put.

The outer-disk trunnions are somewhat larger than the inner disk trunnions, and it will be noted that each outer disk bears upon two of the inner disks and all of the disks are of the same size. In each example of my improvement the outer and inner rolling antifriction devices will be equal in number and any desired number may be employed, and as the outer series engages with the inner series it is obvious that both series will be held in their proper position, or, in other words, prevented from displacement. The trunnions of the several rollers form the principal bearings, and it will be noticed that they are short in proportion to the diameter of the enlarged portions or disks, which run in annular grooves and upon the walls of which they depend to keep them in place laterally and prevent twisting of the parts.

In Fig. 1 the parts 9 11 12 form a casing, and in Fig. 3 the parts 25, 26, 27, and 28 form a casing.

A great advantage in my invention is gained in the durability and ease of operation at all times over the bearings requiring oil, which mixes with dust and forms a mixture which, becoming gummy, causes the parts to run hard, thus necessitating frequent laborious and disagreeable cleaning.

A paramount advantage possessed by my invention is the entire absence of all rub-friction between the parts in their movement in their respective circuits.

Having thus described my invention, I claim as new and desire to secure by Letters Patent—

1. An antifriction-bearing, comprising a shaft, an annulus surrounding a portion of said shaft but not engaging therewith, a series of rolling antifriction devices supported on the annulus, a series of outer rolling antifriction devices engaging with the first-named antifriction devices, and a casing, bearing on the last-named antifriction devices, substantially as specified.

2. An antifriction-bearing, comprising a shaft, an annulus surrounding a portion of said shaft but not engaging therewith, balls engaging on said annulus, an outer series of balls bearing on the inner balls, a ring surrounding the shaft and having a bearing for the outer balls, and a cap connected to said ring and also having a bearing for the outer series of balls, substantially as specified.

3. An antifriction-bearing, comprising a shaft, an outwardly-extending flange on said shaft having a bearing-surface for balls, a disk supported on the shaft and having a bearing for said balls, an annulus surrounding the shaft between the flange and disk, balls supported on said annulus, outer balls engaging with the first-named balls and with the bearings of the flange and disk and a casing engaging with said outer balls, substantially as specified.

4. An antifriction-bearing, comprising a shaft or axle, an outwardly-extended flange on said shaft or axle, a disk on a portion of the shaft or axle, there being a space between the flange and disk, a grooved annulus in said space but free from the shaft or axle, balls engaging in the groove of the annulus, the said balls being within the space mentioned, an outer series of balls engaging with the first-named series and also with the peripheries of the flange and disk, a ring surrounding the shaft or axle, but free therefrom, the said ring having a raceway or bearing-surface for the outer balls, and a cap adjustable relatively to the ring, said cap also having a raceway or bearing for the outer balls, substantially as specified.

JAMES E. LAWRENCE.

Witnesses:
L. JODOIN,
F. J. DAIGNEAER.